United States Patent
Appl et al.

(10) Patent No.: US 9,316,248 B2
(45) Date of Patent: Apr. 19, 2016

(54) LOAD-INDICATING WASHER

(75) Inventors: Joerg Appl, Feldkirch (AT); Arjen Detmer Dijkhuis, Feldkirch (AT); Marc Schaeffer, Feldkirch-Nofels (AT); Mathias Goldt, Feldkirch (AT); Andreas Eckstein, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 146 days.

(21) Appl. No.: 13/882,087

(22) PCT Filed: Aug. 24, 2011

(86) PCT No.: PCT/EP2011/064506
§ 371 (c)(1),
(2), (4) Date: Jul. 30, 2013

(87) PCT Pub. No.: WO2012/055600
PCT Pub. Date: May 3, 2012

(65) Prior Publication Data
US 2013/0302106 A1 Nov. 14, 2013

(30) Foreign Application Priority Data
Oct. 29, 2010 (DE) .......................... 10 2010 043 170

(51) Int. Cl.
*F16B 31/02* (2006.01)
*F16B 43/00* (2006.01)
*F16B 13/08* (2006.01)

(52) U.S. Cl.
CPC ............... *F16B 43/00* (2013.01); *F16B 31/028* (2013.01); *F16B 13/0858* (2013.01)

(58) Field of Classification Search
CPC ....... F16B 31/028; F16B 31/02; G01L 5/243; E21D 21/02
USPC .......................................... 411/8–11
See application file for complete search history.

(56) References Cited

U.S. PATENT DOCUMENTS

| 3,021,747 | A | * | 2/1962 | Garrett ............................ 411/11 |
| 3,285,120 | A | * | 11/1966 | Kartiala ............................ 411/8 |
| 3,306,154 | A | * | 2/1967 | Bailey ............................ 411/11 |
| 3,601,923 | A | * | 8/1971 | Rosenberg .................... 446/267 |
| 4,613,254 | A | * | 9/1986 | Liebig ........................ 405/259.3 |
| 5,586,851 | A | | 12/1996 | Haage |
| 7,021,153 | B2 | | 4/2006 | Almanstoetter et al. |
| 2004/0200290 | A1 | | 10/2004 | Almanstoetter et al. |
| 2009/0311066 | A1 | * | 12/2009 | Utille ............................... 411/11 |
| 2013/0298687 | A1 | * | 11/2013 | Eckstein et al. ................ 73/761 |

FOREIGN PATENT DOCUMENTS

| CN | 1122908 | 5/1996 |
| DE | 2939096 | 4/1981 |
| DE | 4416766 | 2/1995 |
| DE | 19831372 | 1/2000 |

(Continued)

*Primary Examiner* — Flemming Saether
(74) *Attorney, Agent, or Firm* — Davidson, Davidson & Kappel, LLC

(57) ABSTRACT

A direct tension indicator (2), including a base element (11) and a cover element (13) that is arranged on the base element (11) and at least one indicator element (4) that is arranged between the base element (11) and the cover element (13) in order to display an axial force acting between the base element and the cover element. The indicator element (4) includes a dilatant material.

9 Claims, 1 Drawing Sheet

(56) References Cited

FOREIGN PATENT DOCUMENTS

| | | |
|---|---|---|
| DE | 10316632 | 9/2005 |
| DE | 102004033813 | 2/2006 |
| GB | 2120795 | 12/1983 |
| JP | H10274224 | 10/1998 |
| JP | 2004317510 | 11/2004 |
| JP | 2002181019 | 6/2006 |
| WO | WO2007070933 | 6/2007 |

* cited by examiner

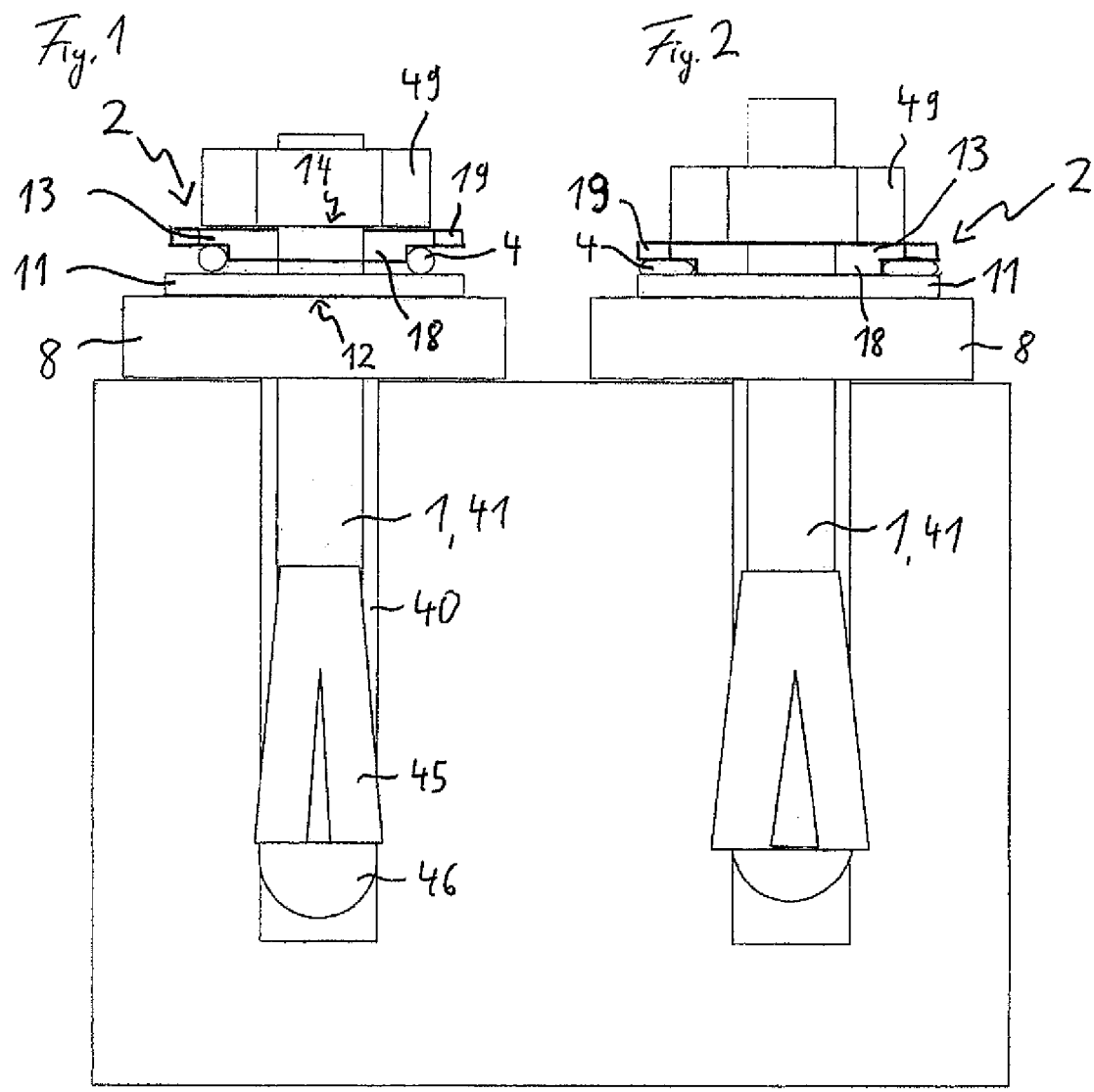

LOAD-INDICATING WASHER

The invention relates to a direct tension indicator, comprising a base element and a cover element that is arranged on the base element and at least one indicator element that is arranged between the base element and the cover element in order to display an axial force acting between the base element and the cover element.

BACKGROUND

When bolts are being put in place, it is often necessary to set the tensioning force in a defined manner. This can be done, for example, by means of a torque wrench. Since, as a rule, there is a relationship between the torque and the tensioning force, it is possible to ascertain the current tension on the basis of the current torque.

However, the tension can also be determined directly, whereby a so-called "direct tension indicator" (DTI) can be employed. Such a direct tension indicator is disclosed, for example, in German patent specification DE 103 16 632 B4. The disk disclosed in DE 103 16 632 B4 has an indicator for checking the tension that has been set on the screw bolt, whereby the indicator consists of capsules that are filled with a dye. At a predefined axial load, the dye comes out of the indicator and/or becomes visible at the edge of the indicator. In comparison to the indirect determination via the torque, the direct determination of the tension by means of a direct tension indicator is more precise since the relationship between the torque and the tension can be subject to fluctuations.

However, it has been found that direct tension indicators do not function reliably in certain cases when they are employed for concrete anchors.

SUMMARY OF THE INVENTION

It is an object of the present invention to provide a direct tension indicator that is particularly reliable.

The present invention provides that the indicator element includes a dilatant material. In particular, the indicator element can be made of a dilatant material.

The invention is based on the insight that the reliability issues that are sometimes encountered when direct tension indicators are used in conjunction with concrete anchors can be ascribed to the hammering step that is normally needed with concrete anchors. During the hammering step, high impact forces act on the anchor and thus also on the direct tension indicator. These impact forces can damage or at least weaken the dye-filled capsules that, according to the state of the art, serve as sensors. This, in turn, can cause the dye to be discharged prematurely, so that it is no longer possible to correctly check the tension while the anchor is being tightened.

This is where the invention comes to the fore, providing for an indicator element that is made of a dilatant material. Such a dilatant material is characterized in that it resists deformation if a force is applied over a short period of time, for instance, less than 0.1 seconds, but, on the other hand, it is deformable if the force is applied for a longer period of time, for example, more than 3 seconds. In this manner, the indicator element made of the dilatant material can absorb forces of short duration such as those that occur due to hammer strikes and that are transmitted from the cover element to the base element, without deformation and thus without losses in the force transmission. If, in contrast, the forces act over a longer period of time such as, for example, when the screw bolt is being tensioned, the dilatant material yields and becomes deformed. This visible deformation, in turn, can serve to indicate the tension that has been set.

According to the invention, an indicator element is thus being put forward which, on the one hand, unlike indicator capsules, is not detrimentally affected by hammer strikes, so that the reliability of the indication is very good, and which, on the other hand, transmits the forces generated by the hammer strikes largely without any impairment, so that a high degree of reliability is achieved when a concrete anchor is hammered in.

According to the invention, the cover element and the base element can each have a through opening, whereby the two through openings are advantageously flush with each other in order to allow the axial passage of a bolt. In particular, it can be provided that the base element and/or the cover element are configured so as to be ring-shaped.

It is likewise preferred for the indicator element to be configured as a ring that is advantageously arranged coaxially to the two through openings. In this manner, the indicator element can be affixed very easily and reliably and, at the same time, this ensures that the indication is very reliable.

Another practical embodiment of the invention lies in the fact that the base element and/or the cover element have an annular disk. This yields a very compact arrangement.

Moreover, according to the invention, a stop can be provided that limits an axial movement of the cover element towards the base element and also limits an axial load of the indicator element. Such a stop can prevent damage to the indicator element in the case of very strong axial loads.

It is especially advantageous for the stop to be formed by a stop ring that projects axially from the base element or from the cover element. Such a stop ring can serve not only as a stop but also to position the indicator element. In particular, it can be provided that at least part of the indicator element surrounds the stop, especially the stop ring. Accordingly, at least part of the indicator element is arranged so as to be radially further towards the outside than the stop. For instance, a ring-shaped indicator element can be provided that surrounds the stop ring. This translates, on the one hand, into a very compact construction and, at the same time, the indicator element is very visible, thus enhancing its operational reliability.

BRIEF DESCRIPTION OF THE DRAWINGS

The invention also relates to a concrete anchor that has a direct tension indicator according to the invention.

The invention will be explained in greater detail below on the basis of preferred embodiments, which are schematically depicted in the accompanying figures. The following is schematically shown:

FIG. 1: a longitudinal sectional view of a concrete anchor with a direct tension indicator according to the invention in the unloaded state; and FIG. 2: a longitudinal sectional view of the concrete anchor with the direct tension indicator according to the invention from FIG. 1 after tension has been applied.

DETAILED DESCRIPTION

FIGS. 1 and 2 show an embodiment of a concrete anchor 1 according to the invention, on which there is a direct tension indicator 2 according to the invention. The concrete anchor 1 has a bolt 41 that is inserted into a drilled hole 40. At the foot end of the bolt 41 arranged in the drilled hole 40, there is an expansion sleeve 45 as well as an expansion cone 46 for the expansion sleeve 45. A tension nut 49 is provided at the opposite end of the bolt 41.

The direct tension indicator 2 according to the invention is arranged between the tension nut 49 and the element 8 that is to be anchored, and it is in contact with the tension nut 49. The direct tension indicator 2 has a ring-shaped base element 11 as well as a likewise ring-shaped cover element 31, whereby the cover element 13 faces the tension nut 49 while the base element faces the element 8 that is to be anchored. The disk-shaped base element 11 and the disk-shaped cover element 13 each have a through opening 12 and 14, respectively, through which the bolt 41 is inserted.

On the cover element 13, there is a stop ring 18 that, as seen axially with respect to the through openings 12, 14, in other words, in the lengthwise direction of the bolt 41, projects axially from the cover element 13 towards the base element 11. This stop ring 18 limits axial movement of the cover element 13 towards the base element 11.

Between the base element 11 and the cover element 13, there is a ring-shaped indicator element 4 made of a dilatant material which surrounds the stop ring 18 and which, when in the unloaded state as shown in FIG. 1, extends axially over the stop ring 18. In the unloaded state, the ring-shaped indicator element 4 has, for example, a circular cross section as shown in FIG. 1.

If the tension nut 49 is then tightened in order to tension the concrete anchor 1 as shown in FIG. 2, the base element 11 and the cover element 13 are pressed together axially between the tension nut 49 and the element 8 that is to be fastened. In this process, the indicator element 4 situated between the base element 11 and the cover element 13 is compressed axially. Since the tension is applied over a relatively long period of time, the dilatant indicator element 4 becomes deformed and expands radially as a function of the axial compression, so that the indicator element 4 loses its circular cross section (FIG. 2). This deformation can be utilized according to the invention as a measure of the tension that is acting on the bolt 41. In order for the deformation of the indicator element 4 to be highly visible, at least one inspection window can be arranged in the base element 11 and/or in the cover element 13. In the embodiment shown, a ring-shaped inspection window 19 is arranged radially on the outside of the cover element 13.

As the tension increases, the indicator element 4 becomes more and more deformed until the stop ring 18 of the cover element 13 strikes against the base element 11. Consequently, the stop ring 18 protects the indicator element 4 against excessive loads.

If axial forces of short duration act upon the direct tension indicator 2 while the bolt 41 is being hammered into the drilled hole 40, then, due to the dilatant properties of the indicator element 4, the indicator element 4 does not deform appreciably, so that the indicator function of the indicator element 4 is not detrimentally affected by these strikes.

What is claimed is:

1. A direct tension indicator comprising:
    a base element;
    a cover element arranged on the base element; and
    at least one indicator element arranged between the base element and the cover element to display an axial force acting between the base element and the cover element, the indicator element including a dilatant material.

2. The direct tension indicator as recited in claim 1 wherein the base element and the cover element each have a through opening.

3. The direct tension indicator as recited in claim 2 wherein the two through openings are flush with each other to allow axial passage of a bolt.

4. The direct tension indicator as recited in claim 1 wherein the indicator element is configured as a ring.

5. The direct tension indicator as recited in claim 1 wherein the base element and/or the cover element include an annular disk.

6. The direct tension indicator as recited in claim 1 further comprising a stop limiting an axial movement of the cover element towards the base element and also limiting an axial load of the indicator element.

7. The direct tension indicator as recited in claim 6 wherein the stop includes a stop ring projecting axially from the base element or from the cover element.

8. The direct tension indicator as recited in claim 6 wherein at least part of the indicator element surrounds the stop.

9. A concrete anchor comprising the direct tension indicator as recited in claim 1.

* * * * *